INVENTOR.
Werner Flieg
BY
ALAN K. ROBERTS
ATTORNEY

INVENTOR.
WERNER FLIEG
BY
ALAN K. ROBERTS
ATT.

INVENTOR.
WERNER FLIEG
BY
ALAN K. ROBERTS
ATT.

INVENTOR.
WERNER FLIEG
BY
ALAN K. ROBERTS
ATT.

INVENTOR.
WERNER FLIEG
BY
ALAN K. ROBERTS
ATT.

INVENTOR.
WERNER FLIEG
BY
ALAN K ROBERTS
ATT

INVENTOR.
WERNER FLIEG
BY
ALAN K. ROBERTS
ATT.

INVENTOR.
WERNER FLIEG
BY
ALAN K ROBERTS
ATT.

Feb. 8, 1966 W. FLIEG 3,233,715

TRANSMITTER RECEIVER MACHINE EMPLOYING PRINT SPHERE TYPEWRITER STRUCTURE

Filed April 20, 1964

15 Sheets-Sheet 10

INVENTOR.
WERNER FLIEG

BY

ALAN K. ROBERTS
ATT.

INVENTOR.
WERNER FLIEG
BY
ALAN K. ROBERTS
ATT.

INVENTOR.
WERNER FLIEG
BY
ALAN K ROBERTS
ATT.

Feb. 8, 1966 W. FLIEG 3,233,715

TRANSMITTER RECEIVER MACHINE EMPLOYING PRINT SPHERE TYPEWRITER STRUCTURE

Filed April 20, 1964 15 Sheets-Sheet 15

3,233,715
Patented Feb. 8, 1966

3,233,715

TRANSMITTER RECEIVER MACHINE EMPLOYING PRINT SPHERE TYPEWRITER STRUCTURE

Werner Flieg, Newton Center, Mass., assignor to Invac Corporation, Waltham, Mass.

Filed Apr. 20, 1964, Ser. No. 361,189
3 Claims. (Cl. 197—19)

This invention relates to data printing devices such as typewriters and the like of the type which are adapted to transmit electrical signals corresponding to the information being printed and to receive and respond to information signals adapted for controlling a printing or typing operation. The invention, moreover, relates to associated methods.

The invention is particularly concerned with adapting electrically powered typewriters for the above-mentioned purposes so that it is possible to employ the same both for typing operations and information signal transmitting functions on the one hand, and for receiving information signals and responding to the same to perform typing operations.

Apparatus of the invention is particularly suitable for use in computer input-output operations, for off-line data preparation, for communications transmission and receiving, for X–Y coordinate plotting, for inquiry and reply in data processing and information retrieval systems, and for data logging, for process control data collection and check-out systems. These applications are mentioned by way of example and not limitation.

Among the various advantages and features of the invention are the minimum space requirements, the use of a stationary carriage, the extreme flexibility of the apparatus and electrical circuitry, the simplifying of interface problems and the compatability of the equipment with solid state operations.

Other features of the invention include the use of techniques which eliminate switch chatter and which further minimizes radio frequency interference.

Further features of the invention relate to the provision of timing means which in advantageous manner synchronize the apparatus of the invention to cooperating equipment.

The invention is especially adaptable to typewriters of the type including a spherical print head having for example two degrees of control, as will be further clarified hereinafter. This type of typewriter will normally comprise key levers adapted to control the head with mechanical means operatively coupling these levers to the head to control the same. The invention contemplates in accordance with one of the various aspects thereof, the provision of photoelectric means responsive to the aforesaid mechanical means for generating information signals corresponding to the control of the spherical print head. These information signals may be transmitted to cooperating apparatus for use or storage therein.

In a typewriter of the above noted type, printing means will be normally coupled to the spherical head to actuate the same to perform a printing operation. Power means will be employed to energize said printing means and to energize selection means which cause the printing head to effect a selective printing operation. As will be explained hereinafter, it is one of the features of the invention to provide a particular advantageous means to provide timing signals for the printing means and which may be further employed for various other functions as will be described.

According to one embodiment of the invention, there is provided apparatus comprising a printing means adapted to effect a printing operation and a motor adapted to supply power for such operation, there being contemplated the use of coupling means for coupling the motor to the printing means to supply a driving force for the latter. Said coupling means is normally ineffective to couple the motor and printing means, but a control means is provided to cause the coupling means to couple the motor and printing means for a determinable but limited rotation of the motor whereafter the printing means and motor are automatically decoupled. The control means employed has a determinable actuation time or, in other words, undergoes a delay before effecting a coupling of the motor and printing means.

In the aforedescribed apparatus the invention contemplates the use of timing means coupled to and driven with the printing means and a further means such as a photoelectric means operatively associated with and responsive to the timing means for the generation of an electrical signal. This photoelectric means is further coupled to and adapted to provide at least one of the signals necessary to operate the control means. The timing means is synchronized with the printing means in a manner which will be more fully explained hereinafter so that the control means is operated in advance of the decoupling of the printing means and motor to provide for a continuous printing operation.

According to a further feature of the invention, the above-noted timing means is constituted by a timing disc having at least one, but preferably several, particularly dimensioned arcuate slots which are photoelectrically scanned and which have such a relationship with the motor and printing means as to provide a predetermined synchronization technique.

There is also contemplated within the scope of the invention a transmitter encoding means responsive to mechanical members, the movement of which operates the aforesaid spherical print head, for generating information signals. This encoding means includes photoelectric switches associated with respective of the aforesaid mechanical members and comprising light sources and light sensitive elements and displaceable shutters for selectively screening the light sensitive elements from the light sources to generate the aforesaid information signals. The encoding means, moreover, comprises slides including, for example, flanges adapted for being engaged by the aforesaid mechanical members as will become apparent hereinafter.

Also within the scope of this invention is the provision of a receiver operating means associated with the aforesaid mechanical members and responsive to externally supplied information signals for selecting a character on the aforesaid printing sphere. This receiver operating means preferably comprises a number of solenoids operatively associated with the aforesaid mechanical members to operate the same through the intermediary of pivoted levels and rollers, the construction of which will be hereinafter investigated in greater detail.

Still a further feature of the invention relates to the provision of clutch trigger means operative to control a clutch effective between the aforesaid motor and a cycle shaft by means of which various mechanical functions of the apparatus are performed. This clutch trigger means, as will be shown, comprises a trigger solenoid, a pivoted trigger lever operated thereby and a pivoted fish tail lever operated by the trigger lever and having engagement with the aforenoted control means in such a manner that a coupling between said motor and said shaft is controlled.

The shaft referred to above will be known in the description which follows as a cycle shaft which is driven by the aforesaid motor through the intermediary of a clutch means. The timing means referred to above is preferably driven in a 1:1 relationship with the cycle shaft and in accordance with a preferred embodiment of the invention is a disc provided at a first radial distance from its axis of rotation with two diametrally opposed first arcuate slots of equal length and a second radial distance with two further and shorter diametrally opposed second arcuate slots. Said slots are photoelectrically inspected by photoelectric units straddling this disc such as to be adapted for causing the generation of signals indicating first and second states. The slots are of such length and orientation that one of the units generates a data gate signal being in first state from about 0–43° and 167–180° of each half rotation of cycle shaft and in second state between about 43–167° of said half rotation and such that the other of said units generates a clutch gate signal in first state from about 0–43° and 107–180° of each half rotation of said cycle shaft and in second state between about 43–107° of said half rotation. The use of said data gate and clutch gate signals will be explained in greater detail hereinafter.

There further contemplated in accordance with the invention the provision of means responsive to an externally supplied signal indicating the availability of information for said receiver operating means and to said clutch gate signal to actuate the aforesaid trigger means to engage the motor and cycle shaft.

There is still further contemplated a provision of means responsive to the data gate signal to transmit further information signals to the receiver operating means to actuate the same to select a character on the aforesaid spherical print head.

Yet other means are provided responsive to the clutch gate signal to transmit signals from the transmitting encoding means to apparatus cooperating therewith.

Further included amongst the objects of the invention are the provision of improved devices and sub-combinations thereof and methods for the handling and transmission of data.

Other objects, features and advantages of the invention will be apparent from the following detailed description of a preferred embodiment as illustrated in the accompanying drawing in which.

Reference has heretofore been made to a spherical print head as employed in accordance with a preferred embodiment of the invention. Nevertheless it will be apparent from the following disclosure of various features of the invention that while such features enjoy a special cooperation with the spherical print head and the mechanical elements employed in association therewith, said features are not necessarily limited to use with the spherical print head. Therefore the spherical print head will be described hereinafter with the idea of showing the same and the associated elements as a preferred environment for the inventive features of the invention and in fact constituting a preferred embodiment of the latter without being limitative of the scope of the invention.

Figure 1:
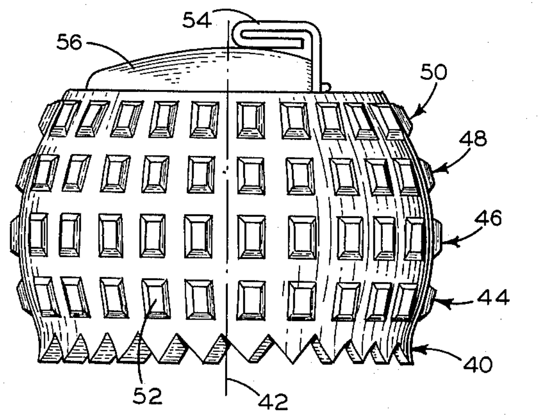
FIGURE 1 is a side view of a spherical print head employed in a preferred embodiment of the invention.

The spherical print head is illustrated in side view in FIG. 1, wherein it is seen to constitute a ball-shaped type head 40 having an axis of rotation 42 about which, as will be shown, said head is both rotatable and tiltable in a plane extending through said axis and including the same.

Said head includes four bands 44, 46, 48 and 50 of surface print characters (see for example character 52), said bands being parallel to one another and concentric with each other relative to the axis 42. Said bands are spaced axially along the said axis and the characters in each band are equidistantly spaced circumferentially around said head. As will become apparent hereinafter, one of the entire selection of eighty-eight characters on the head can be brought at a given time to a position effective for a printing operation, this selection being made by both rotating and tilting said head.

Also appearing in FIG. 1 is a spring retaining clip 54 working in association with the head cover 56 by means of which the head can be retained in position on a supporting assembly to be described hereinafter.

Figure 2:
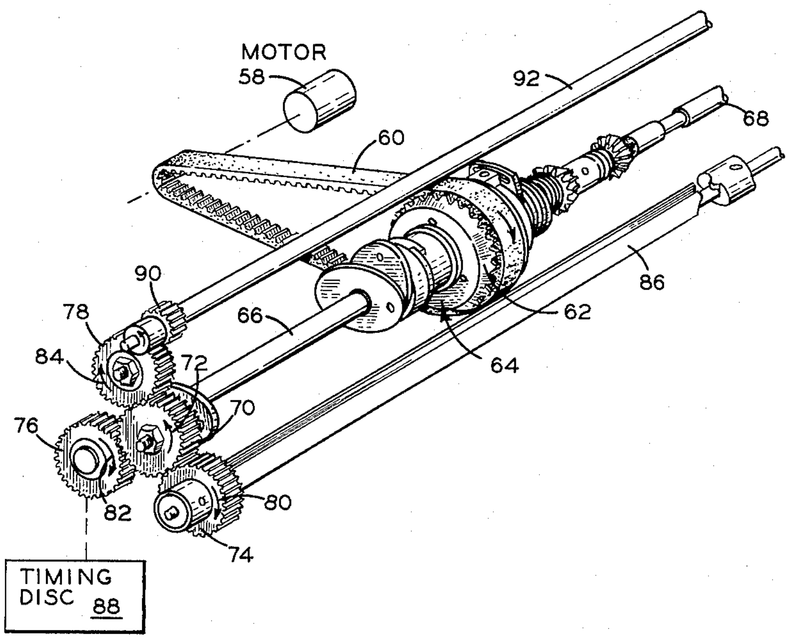
FIGURE 2 is a partially perspective view and a partially diagrammatic view of a drive mechanism employed in said preferred embodiment of the invention.

A drive mechanism by means of which the selection of a character on the aforedescribed head can be effected and by means of which a printing operation can be caused to be performed appears in FIG. 2, wherein appears the motor 58. The motor may be, for example, a 3" shaded pole induction type motor operating on 115 volt, 60 cycle, A.C. and rated, for example, at one-fortieth of a horsepower. The motor can be mounted on the frame (not shown) of the typewriter.

Said motor operates through a drive belt 60 to rotate a pulley 62 which, through the intermediary of a clutch means 64, drives the cycle shaft 66 when a proper coupling is effected.

On the other side of pulley 62 is an operational cam shaft 68, the purpose of which is to provide camming functions for controlling machine operations of the nature which will be indicated hereinafter.

Mounted on the cycle shaft 66 is a spur gear 70 which is rotated in the direction of the arrow 72. Spur gear 70 operates to drive three further spur gears 74, 76 and 78 in the direction of arrows 80, 82 and 84, respectively.

A filter shaft 86 is coupled to and driven by spur gear 74. The function of filter shaft 86 will be described in greater detail hereinafter. Spur gear 76 is coupled to timing disc 88 the operation and function of which will also be hereinafter described in greater detail. Spur gear 78 operates through spur gear 90 to drive the print shaft 92, the operation and function of which will also become apparent. Filter shaft 86, timing disc 88 and print shaft 92 are rotated in 1:1 relationship with the cycle shaft 66 when the latter is driven by motor 58.

Various cams, not yet numerically designated, appear on various of the shafts and perform a number of functions which will be later described.

Figure 3:
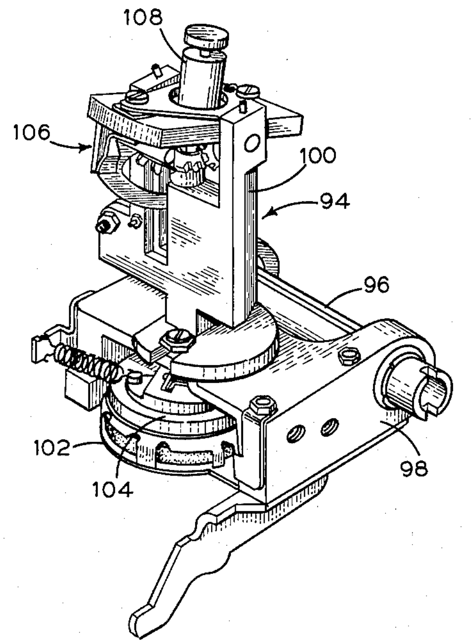
FIGURE 3 is a perspective view of a rocker assembly upon which the aforesaid spherical head is mounted for effecting a printing operation.

The spherical print head of FIG. 1 is mounted on the support structure 94 generally illustrated in FIG. 3. This structure comprises generally a hollow rocker shaft 96 on which is mounted a rocker 98 on which is supported in turn a yoke 100.

Rotatably mounted within the rocker 98 are pulleys 102 and 104 and supported in the yoke 100 is a gear system 106 intended to tilt and rotate the head support assembly 108.

Figure 4:
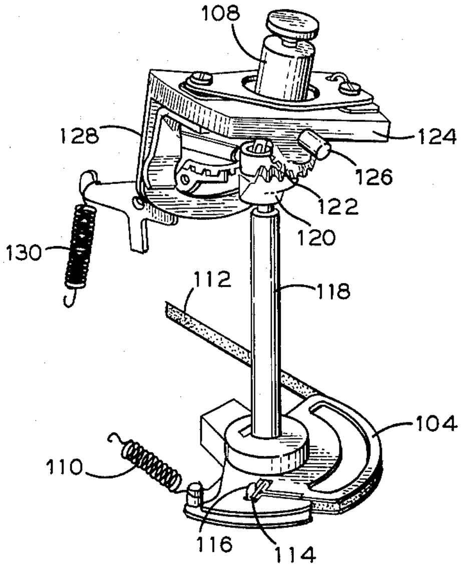
FIGURE 4 is a perspective view of a control adapted for selecting a particular position for the spherical print head with respect to one of the degrees of movement thereof.

FIGURE 4 illustrates in perspective view a portion of the apparatus of FIG. 3 by means of which the tilting of the spherical head is effected and in FIG. 4 can be seen the pulley 104 loaded by a tension spring 110 by means of which pulley 104 is maintained in or urged towards a given position of rest. Pulley 104 has a tape 112 connected thereto by means of a T-shaped tape connector 114 accommodated in slot opening 116.

As will be shown hereinafter, various control devices are provided to operate through tape 112 to rotate the pulley 104 to desired extent.

Mounted on pulley 104 and extending vertically upwardly therefrom is a tilt sector tube 118 atop of which is mounted a tilt sector gear 120. In cooperative relationship therewith is provided a second tilt sector gear 122.

Tilt sector gear 122 is mounted on tilt ring 124 which is pivotable on pivot pin 126. Ring 124 has flange 128 attached thereto, a spring 130 being effective to urge ring 124 to a determinable position of rest.

Although further description will follow hereinafter with respect to supporting head support assembly 108 it can now be indicated that the spherical print head mounted on support assembly 108 can be tilted by a displacement of tape 112 which causes a rotation of pulley 104 in turn causing a rotation of tilt sector tube 118 which is effective through tilt sector gear 120 to displace tilt sector gear 122 relative to pivot pin 126 whereby the tilt ring 124 is likewise pivoted on pin 126 to tilt support assembly 108.

Figure 5:
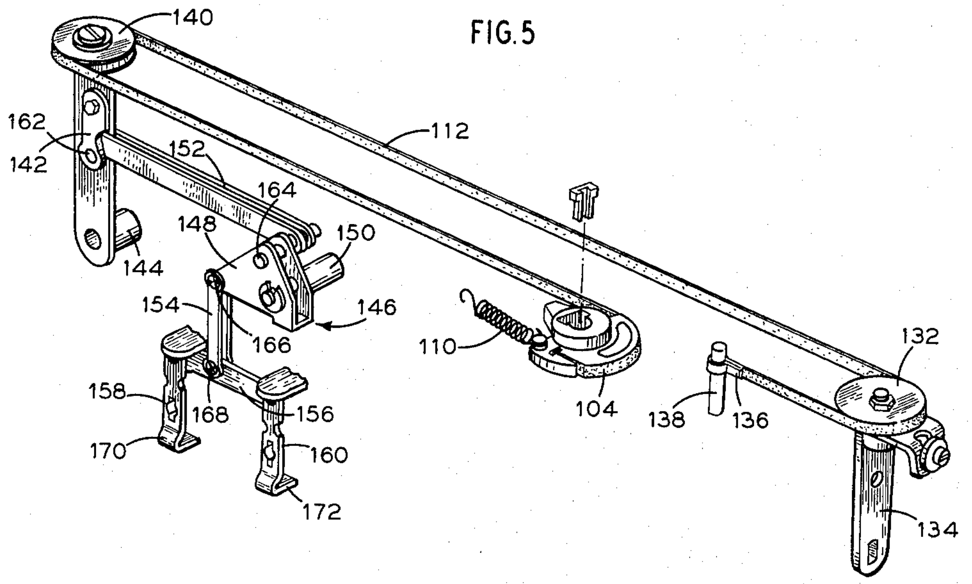
FIGURE 5 is a perspective view of a control system for controlling the apparatus of FIG. 4.

Tilt tape 112 also appears in FIG. 5 wherein it is shown in engagement with pulley 104 which is spring loaded by spring 110.

FIG. 5, moreover, illustrates a pulley 132 mounted on a support 134 which may be considered fixed relative to the frame of the typewriter and is in fact fixed other than for purposes of adjusting the position of pulley 132. Tape 112 passes around pulley 132 and is connected at one free extremity 136 to a fixed post 138.

Between the two extremities of the tape 112 is mounted a further pulley 140 mounted on a pivotable support 142 which is pivotable on a collar 144 mounted on a pivot pin (not shown).

The tape 112 is of substantially fixed length since it is fabricated of a material such as steel. It therefore follows that the position of pulley 104 depends upon the distance between pulleys 132 and 140, the latter of which is displaceable on its support 142.

Displacement or pivoting of support 142 is effected by means of a control assembly 146 comprising bell crank 148 pivotable on pin 150, links 152, 154 and 156 and tilt latches 158 and 160.

Link 152 is pivotally connected to support 142 by pin 162 and to bell crank 148 by pin 164. Link 154 is pivotally connected to bell crank 148 by pin 166 and to link 156 by pin 168.

Displacement of the control assembly 146 is effected through latches 158 and 160 through the intermediary of the hooked portions 170 and 172 thereof, these hooked portions being selectively engaged or not, as will become hereinafter apparent.

Tilt latches 158 and 160 may be considered as mechanical binary controls and enable four degrees of control ($2^2$) as follows: when neither of the aforesaid hooked portions are pulled downwardly, pulley 104 is at a position of rest in accordance with which a selected one of the bands of characters on the spherical print head is in position effective for printing (rotational control not having yet been discussed). Pin 168 is not centrally located in link 156 and is instead one-third of the distance over from the left extremity of this link. Downward displacement of link 158 through the intermediary of action on hooked portion 170 therefore gives one degree of movement of bell crank 148 and one degree of movement of support 142 and thus of pulley 104 to select a second of the bands on the spherical print head. Downward movement of link 160 by downward action on hooked portion 172 being twice the distance from pin 168 imparts another degree of movement to support 142 and therefore another degree of movement to tilt pulley 104 to select a third band on the spherical print head. Downward movement on both latches 158 and 160 simultaneously effects still a fourth degree of movement of support 142 and pulley 104 whereby the fourth of the bands on the spherical print head can be positioned for purposes of a printing operation.

Figure 6:
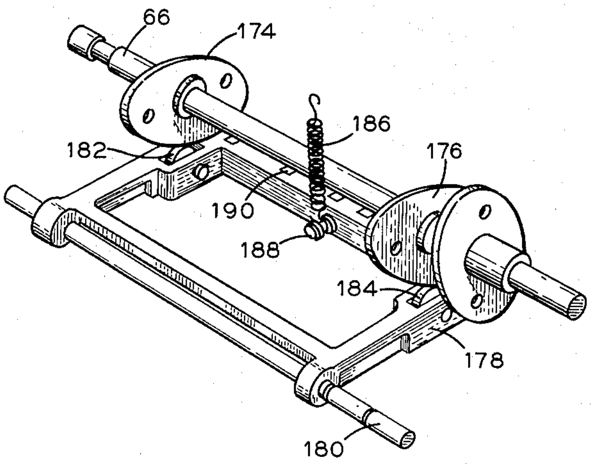
FIGURE 6 is a perspective view of a system for actuating the apparatus of FIGS. 4 and 5.

FIGURE 6 illustrates the mechanical apparatus by means of which the latches 158 and 160 of FIG. 5 are engaged and displaced.

In FIG. 6 can be seen the cycle shaft 66 of FIG. 1 with cams 174 and 176 thereon in aligned relationship, said cams being of ellipsoidal shape. Beneath the shaft 66 is mounted a latch bail 178 constituted by a rectangular frame pivotally mounted on a bail shaft 180 supported on the typewriter frame.

Rotatably mounted in the latch bail are rollers 182 and 184, said rollers being aligned with the cams 174 and 176 by means of which a pivotal movement is imparted to latch bail 178. Said latch bail is engaged by a tension spring 186 coupled to a pin 188 on said latch bail whereby the latter is maintained engaged with the aforesaid cams.

Figure 7:
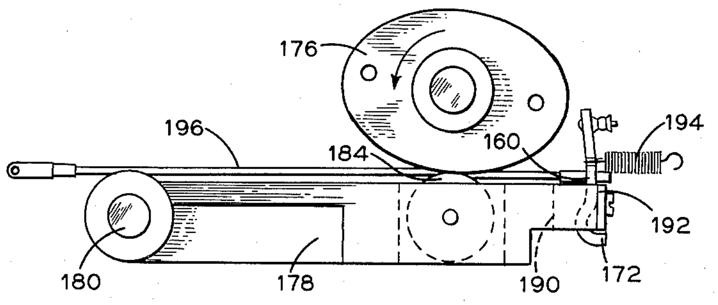
FIGURE 7 is a side view of the appartus of FIG. 6 illustrating the connection thereof with the apparatus of FIG. 5.

At the rear of latch bail 178 appear a number of slots 190 within which the aforesaid tilt latches are selectively received, as is best seen in FIG. 7.

In FIG. 7 appears the latch bail 178 mounted on bail shaft 180 and having its rollers 182 and 184 engaged by cams 174 and 176.

It will also be seen that slots 190 are rearwardly covered by a latch bail plate 192 beneath which the hooked portions 170 and 172 of the tilt latches 158 and 160 are intended to engage selectively.

Also appearing in FIG. 7 is a spring 194 representative of the springs associated with each of said latches to maintain the same normally in engagement with plate 192. Still further appears a tie rod 196 representative of the various tie rods respectively engaged with the tilt latches to pull the same out of engagement with plate 192 by means of selective control hereinafter described.

It will appear from what has been described above that the tilt latches may be displaced downwardly through the intermediary of latch bail 178 other than when said tilt latches are pulled away from plate 192 by the tie rods associated therewith.

Figures 8, 9:
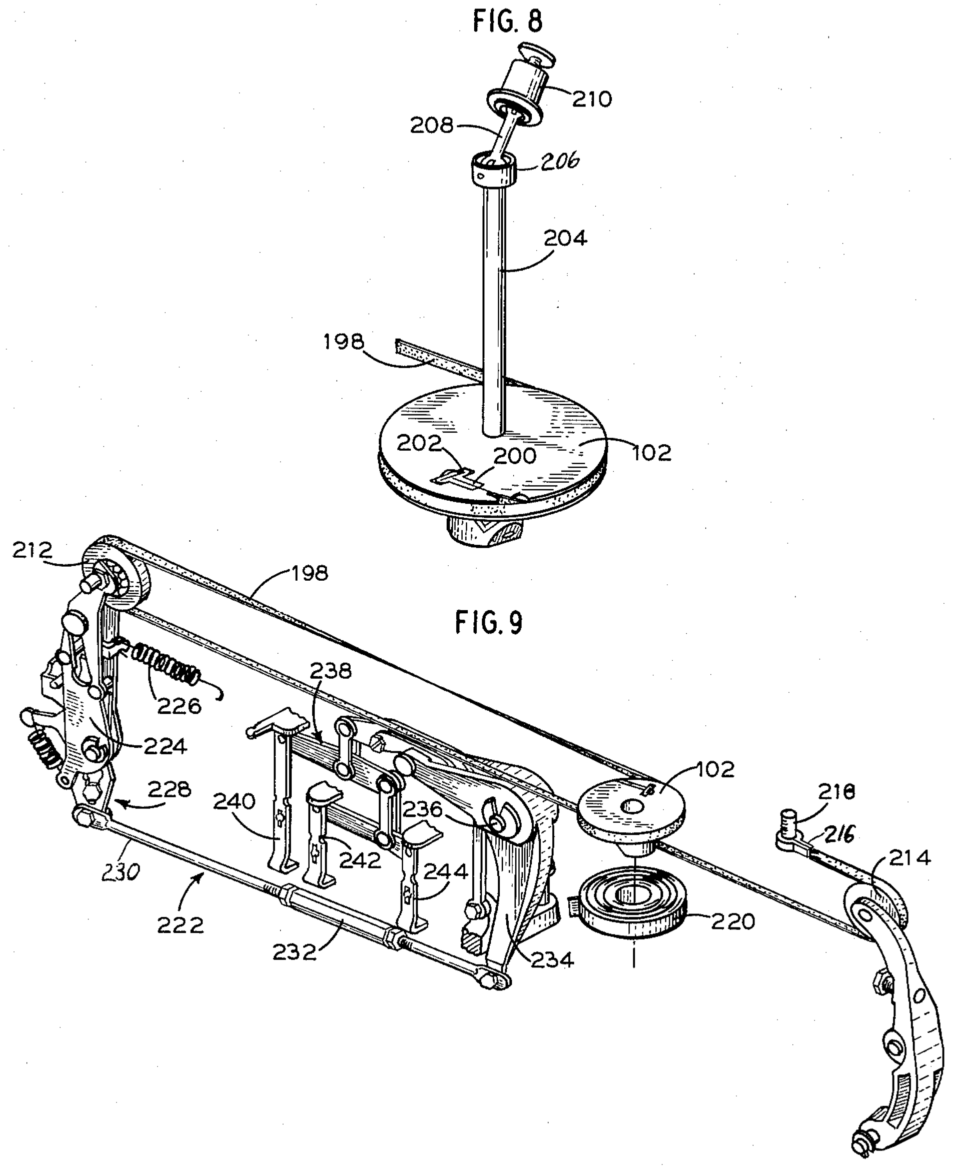
FIGURE 8 is a perspective view of apparatus for controlling spherical head in another of the degrees of movement thereof.
FIGURE 9 is a perspective view illustrating apparatus for controlling the structure of FIG. 8.

The mechanism for providing for the tilting of the spherical print head has been described above and reference is now made to the second degree of control of the spherical print head, to wit, the rotational control with reference to which attention is directed to FIG. 8.

In FIG. 8 appears pulley 102 previously indicated relative to FIG. 3 and in association with which is provided a rotate tape 198 having a free extremity 200 accommodated and held in a slot 202 in said pulley 102.

Coaxial with pulley 102 and mounted atop the same is a rod 204 (accommodated within the tilt sector tube 118 of FIG. 4).

A lower ball socket 206 is supported on top of rod 204 and universally accommodates one end of a ball joint 208, the other end of which is accommodated in the upper ball socket 210 (forming part of the head support assembly 108 in FIG. 3).

It appears from the description of the structure last set forth above that the same constitutes a rotation means which will not interfere with the previously described head tilting operation.

This rotation is effected by means of the apparatus illustrated in FIG. 9 wherein appears pulley 102 and tape 198.

Tape 198 passes around a left hand pulley 212 and a right hand pulley 214, the axes of which are horizontally disposed, the free end 216 of tape 198 being connected to a fixed post 218.

Similar to the previously described tilt control the rotational position of pulley 102 is controlled by the distance of pulleys 212 and 214 with the pulley 102 being returned to a position of rest by a rotate spring 220 and being otherwise controlled by a rotate control mechanism 222.

The rotate control mechanism comprises a rotate arm 224 supporting pulley 212 and loaded by a spring 226 to a predetermined position of rest. Said arm is pivoted by a linkage system 228 controlled through the intermediary of an elongated link 230, the length of which is adjustable by means of a turnbuckle 232.

The rightmost extremity of link 230 is pivotally connected to a rotate bell crank 234 pivoted on pin 236 and connected through a linkage system 238 to three latches 240, 242, 244 provided with hooked portions such as those previously described. Latches 240, 242 and 244 constitute parts of a mechanical binary control, the various combinations of which may be deduced from the explanation given above with respect to the tilt latches, latches 242 and 244 being operatively associated with the latch bail 178 of FIGS. 6 and 7 in a manner identical to that previously described.

It follows from the description given above that the rotation of rod 204 of FIG. 8 can be effected incrementally by applying a downward traction force to one or more of latches 240, 242 and 244 in various combinations or by failure to apply downward forces to any of said latches whereby the spherical print head will be rotated from a pre-selected rotational position of rest whereby one vertical strip of the aforesaid surface characters will be effectively aligned in printing position.

From what has been stated above, it now follows that selection can be made in rotational and tilting sense with respect to the characters of the aforesaid spherical print head. These two degrees of selection will bring to a position effective for printing a single character on the print head whereafter said print head may be impelled against a record medium such as a sheet of paper backed by a platen to effect a typing or printing operation.

Figure 10:
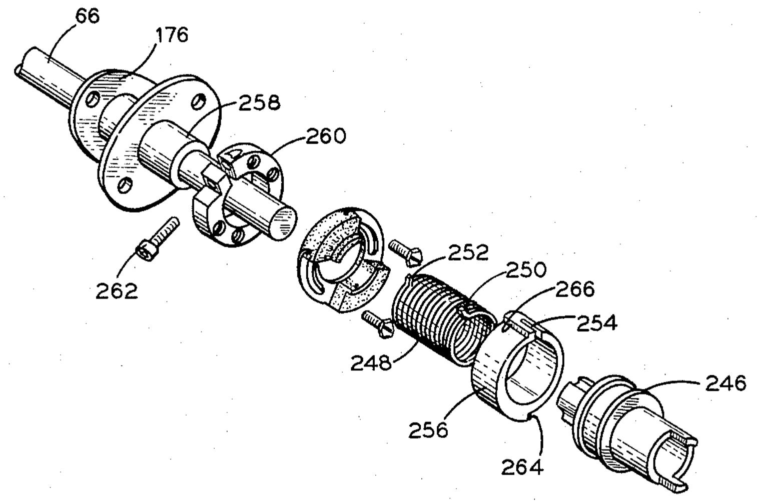
FIGURE 10 is an exploded perspective view of a clutch assembly employed for coupling the motor referred to above with the cycle shaft.

Leaving temporarily the matter of positioning the spherical print head, reference is made again to the fact that the motor of the subject typewriter is not always operatively coupled to the cycle shaft 66 as appears in FIG. 10 wherein is also shown for purposes of orientation the cam 176 of FIG. 7.

Cycle operation occurs each time a character is printed and everything related to printing a character is powered by the cycle shaft either directly or indirectly.

In FIG. 10 appears the cycle clutch pulley hub 246 which is in continuous rotation whenever the aforedescribed motor is running. A clutch spring 248 forms a driving connection between the cycle shaft 66 and the hub 246. A clutch is employed, as will be shown, to provide a means of engaging and disengaging the hub 246 relative to shaft 66.

Clutch spring 248 is a coil spring wound around an extremity of hub 246 and an extremity of shaft 66, the spring engaging the same when its inside diameter tends to be less than the outside diameter of the same and being disengaged therefrom when its inside diameter is greater. When a relative movement imparted to the spring tends to rotate the same in its winding direction the inside diameter of the spring is decreased and it frictionally engages the elements with which it is associated.

As appears in FIG. 10, spring 248 is provided with two radially extending extremities 250 and 252. Extremity 250 is accommodated in slot 254 in cycle clutch sleeve 256. Extremity 252 is clamped against hub 258 on shaft 66 by means of cycle clutch collar 260 which is tightened by means of a screw 262.

In the structure employed in the invention, one end of the spring 248 is held stationary and the other is normally rotated in unwinding direction to enlarge the inside diameter of said spring, this being intended to disengage the clutch and disengage the motor from the cycle shaft. The cycle clutch sleeve 256 which controls the movable end of the clutch spring has two steps 264 and 266 in it rotationally spaced by 180°.

Figure 11:
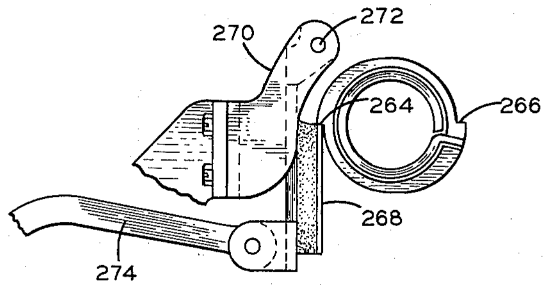
FIGURE 11 is a side view, partially in section, of a clutch engaging means whereby the coupling of the motor and cycle shaft may be controlled.

FIG. 11 illustrates the cycle clutch latch 268 which is adapted for moving into and out of a position of interference with the steps 264 and 266, said latch being pivotally mounted on a bracket 270 and more particularly in pivotal relationship with respect thereto on a pin 272.

The cycle clutch latch 264 in engaging with one of the aforesaid steps stops the rotation of the clutch sleeve thereby stopping the one end of the clutch spring 248. Additional rotation of the opposite end causes an unwinding and the spring is enlarged sufficiently to disengage the motor from the cycle shaft 66.

The amount of force which is applied to enlarge the clutch spring would ordinarily tend to cause the cycle shaft 66 to creep backwards and close the spring. To prevent this backward movement a check pawl (not shown) is employed which becomes effective when the shaft has rotated sufficiently to disengage the clutch.

Operation of the clutch latch 268 is effected through the intermediary of a mechanical member 274 the control of which will be hereinafter explained.

Figure 12:
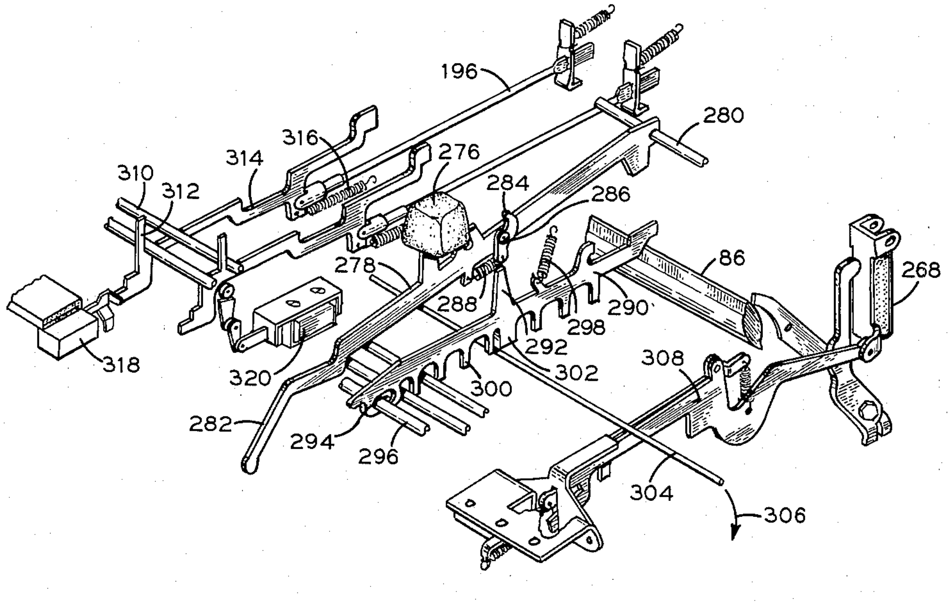
FIGURE 12 is a partially diagrammatic perspective view of a key board section illustrating the mechanical elements by means of which a particular character on said spherical head can be placed into a position wherefrom it is effective to complete a printing operation, this figure further illustrating in part the aforesaid transmitter encoding means and receiver operating means.

FIG. 12 illustrates the manual control system provided for selecting a character on the typewriter of the invention, as well as some of the aforedescribed features of the invention.

In FIG. 12 appears, by way of example, a typewriter key 276 representative of the greater number of keys available in conventional keyboards.

Said key is associated with an elongated key lever 278 pivoted on a key lever rod 280 and displaceable thereabout by forces applied to the associated key. Springs (not shown) are provided under the free end 282 to provide for maintaining the key levers in a given position of rest.

Each key lever 278 is provided with a pawl 284 intended to cooperate with a mechanical member beneath said key lever. Each pawl is pivoted on a pin 286 and spring loaded by a spring 288 whereby to be urged to a normal position of rest relative to its associated key lever.

Beneath each key lever is provided a selector interposer 290 having an upwardly extending lug 292 adapted for being engaged by the pawl 284 superposed thereabove. Each interposer is provided with an opening 294 wherethrough extends an interposer pivot rod 296 about which the interposers may pivot. Each interposer is further spring loaded by a spring 298 whereby to be urged against the associated pawl.

The structure of each interposer is such that it has a plurality of downwardly extending lugs or teeth 300, all except one of which are positioned according to a predetermined code in order to identify the character with which the selector interposer is associated. All said selector interposers, however, comprise a cycle clutch release lug 302 beneath which is located a cycle bail 304 pivotably displaceable in the direction indicated by arrow 306 when engaged by any of the lugs 302. Thus when any key 276 is operated the single selector interposer associated therewith is displaced, but in any event the cycle bail 304 is displaced in the direction of arrow 306.

Movement of the cycle bail 304 is intercepted by a link 308 connected to clutch latch 268 described above so that the spring 248 is released and the cycle shaft 66 coupled to the motor. Rotation of the cycle shaft 66 rotates the filter shaft 86 as appears from FIG. 2.

The displaced selector interposer is moved downwardly into a position of readiness for being driven along its longitudinal axis by filter shaft 86, such movement being permitted by the elongated shape of opening 294. Depending upon the positions of the teeth 300 on the thusly driven selector interposer, one or more of the selector bails 310 will be displaced accordingly. Said selector bails engage upwardly extending lugs 312 on latch interposers 314 which are spring loaded by springs 316 and which are engaged with tie rods 196 (see also FIG. 7) which are tied to latches 158 and 160 (see FIGS. 5 and 7) and latches 240, 242, and 244 (see FIG. 9), the engagement of these with latch bail plate 192 (see FIG. 7) being thusly controlled.

It follows that since the engagement of said latches with the latch bail determines the position of the spherical print head, as has been described above, the operation of a key 276 will operate through interposer 290, selector bails 310 and latch interposers 314 to select a character to be brought to effective printing position. At the same time the operation of key 276, while making the aforesaid selection, will operate through cycle bail 304 and link 308 to disengage cycle clutch latch 268 from cycle clutch sleeve 256 (FIG. 10) thereby permitting spring 248 to tighten on cycle shaft 66 and couple the latter to motor 58 (FIG. 2).

Diagrammatically illustrated in FIG. 12 is a photoelectric switch 318, the details of which will be hereinafter indicated in greater detail. One such photoelectric switch is associated with each of the latch interposers 314 and as will be explained the photoelectric switches are sensitive to movements of the associated latch interposers to generate electrical signals cooperatively constituting information signals indicative of the character being printed.

The generating or encoding of an information signal for purposes of transmission represents the data output function of the apparatus being described. For purposes of receiving signals to effect a typing operation there are employed a number of solenoids represented in FIG. 12 by the solenoid 320 which is effective on receipt of an actuating signal to operate through the associated pivotal link and roller to displace the associated latch interposer 314. This operation will be shown in greater detail hereinafter.

Figure 13:
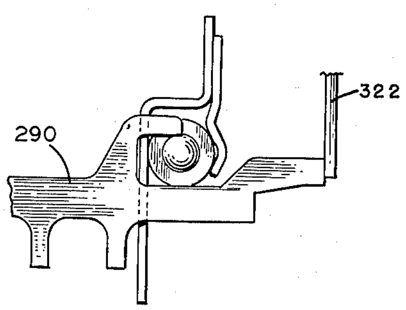
FIGURE 13 illustrates a selector interposer and related spring mechanism prior to the operation of said interposer, these elements being partially broken away.
Figure 14:
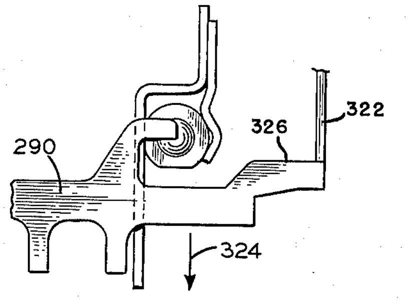
FIGURE 14 is a view similar to that of FIG. 13 illustrating the selector interposer after the initial downward movement thereof.

Of interest in connection with the aforedescribed operation of selector interposers 290 is the mechanism illustrated in FIGS. 13 and 14 wherein an interposer 290 is shown in upper undisplaced poistion (FIG. 13) urged forwardly by an interposer latch spring 322. When said interposer is displaced downwardly as indicated by arrow 324 (in FIG. 14) the spring 322 comes to bear against the upper edge 326 of the interposer so as to maintain the same in a position whereat it can be engaged and driven forwardly by filter shaft 86 (see FIG. 12). Forward motion of the selector interposer 290 will bring the same into position where it can be raised upwardly by the associated spring 298 (see FIG. 12) and reassume the position illustrated in FIG. 13.

Figure 15:
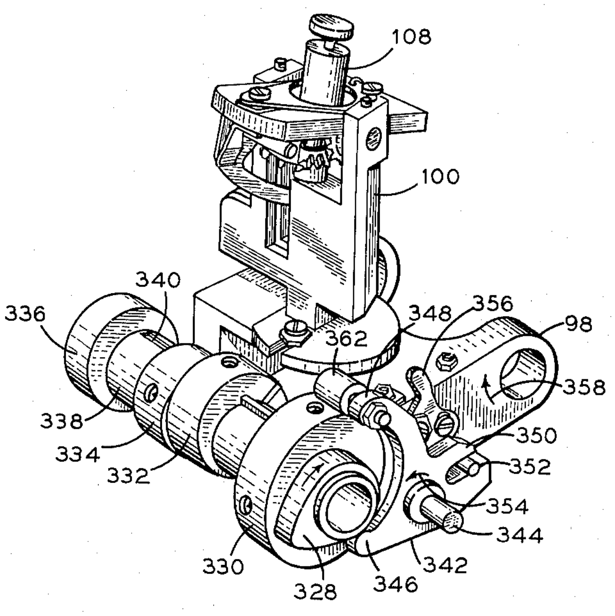
FIGURE 15 illustrates in perspective view the apparatus by means of which a printing movement can be imparted to the spherical print head.

Whereas the major portion of the apparatus described above relates to the selection of a character on the spherical head of the typewriter of the invention, the apparatus illustrated in FIG. 15 relates to the printing of a character and the purpose of this structure is to propel the spherical head against a platen and restore the head to rest position. (For purposes of orientation, attention is directed to, for example, elements 98, 100 and 108, which also appear in FIG. 3.)

In FIG. 15 are illustrated the print cam 328, rebound cam 330, detent cam 332, ribbon feed cam 334, and ribbon lift cam 336, all associated with the print sleeve 338 which rides on the print shaft 92 (see FIG. 2). A keyway 340 provided in sleeve 338 permits a rotary connection between the sleeve 338 and the print shaft, but permits a lateral movement of the spherical head and elements supporting the same. Whenever the print shaft 92 is rotated, the sleeve 338 is likewise rotated.

Detent cam 332 is intended for purposes of spherical head alignment and an understanding of the operations involved in this function are not essential to an understanding of the features of this invention. Similarly, the functions of the ribbon feed cam 334 and ribbon lift cam 336 are not essential to an understanding of the characteristic features of this invention.

The rocker assembly, of which the rocker 98 is a part, is powered by the print cam 328 on the sleeve 338. Operatively associated with cam 328 is a cam follower 342 pivotable on a pin 344. Said follower has two arms 346 and 348, arm 346 being operated by cam 328 and arm 348 being operated by rebound cam 330. A slot 350 is provided in the rear of the cam follower 342 in which there is accommodated a pin 352 controlling the displacement of rocker 98.

Figure 16:
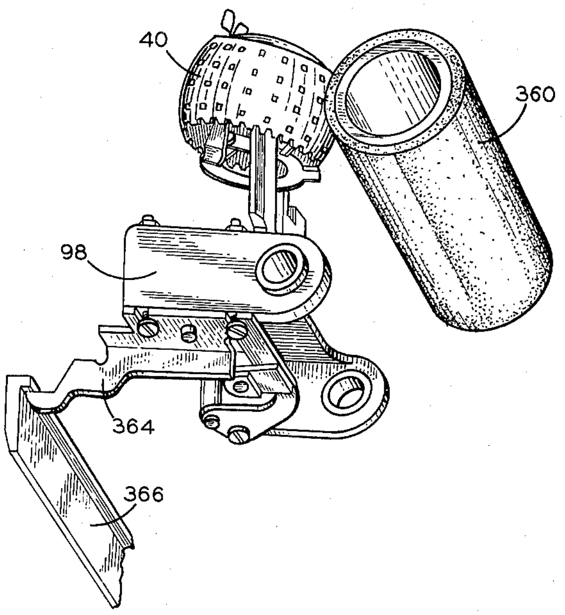
FIGURE 16 is a further view illustrating said spherical head and platen in related positions adapted for effecting a printing operation.

As the cam follower 342 pivots in the direction of arrow 354, pin 352 is raised and operates through a velocity control plate 356 to raise the rocker 98 in the direction illustrated by arrow 358, causing the head 40 to approach the platen 360 (see FIG. 16). The camming surface of rebound cam 330 acts on roller 362 on arm 348 of follower 342 to reverse the direction of said follower to force the rocker 98 back to rest position and prevent the same from rebounding.

FIG. 16, in addition to illustrating the relationship of head 40 and platen 360, further illustrates the association of a striker 364 mounted on rocker 98 and adapted to engage against an anvil 366. The anvil restricts the amount of free travel of the head 40 by interfering with the movement of striker 364 mounted on the rocker 98 so as to provide for a uniform striking force of the head 40 against the platen and the sheet of paper interposed therebetween.

Among the primary objectives of the invention is to provide means and techniques for indicating to cooperating apparatus which of the various characters is being printed by the aforedescribed apparatus. Another of the objectives is to provide for adapting the aforedescribed apparatus to the receipt of incoming signals to control the selection of a character and the printing of the same consistent with the requirements of the various mechanical components described above. As will be explained, this involves a synchronizing function or slaving of the aforedescribed apparatus to cooperating equipment to achieve the desired results in the best manner possible.

Figure 17:
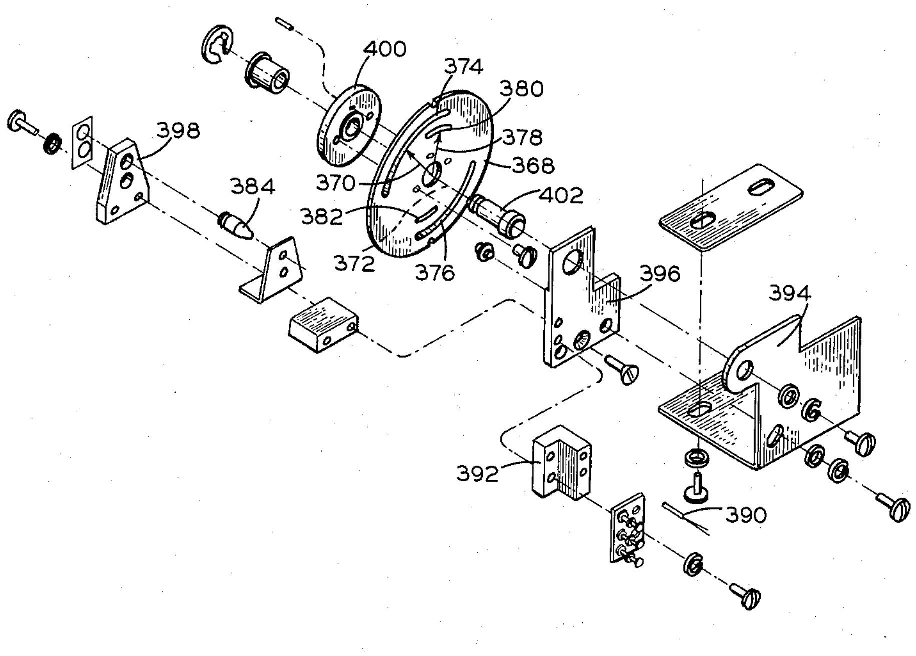
FIGURE 17 is a perspective exploded view of a timing disc assembly employed as a timing means in accordance with a preferred embodiment of the invention.
Figure 18:
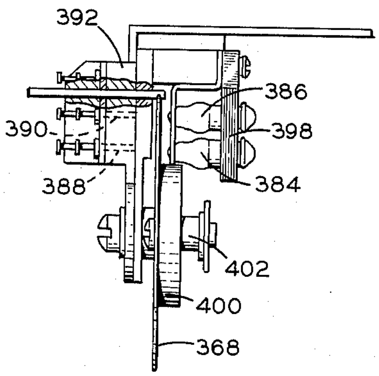
FIGURE 18 is a top plan view of the timing disc assembly partially in section.
Figure 19:
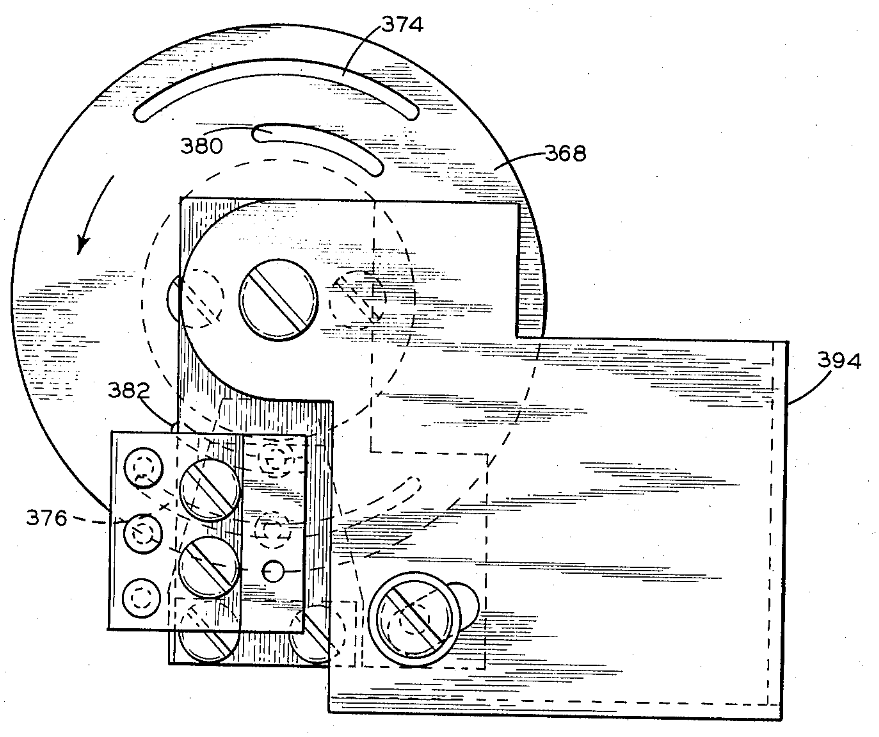
FIGURE 19 is a side view of the timing disc assembly illustrated in FIGS. 17 and 18.

The details of the preferred timing system appear in FIGS. 17, 18 and 19, wherein is described one of the principal features of the invention.

In these latter figures appears a flat circular timing disc 368, equivalent to the disc 88 generally indicated in FIG. 2. Said disc is fabricated of a light impermeable substance and is provided at a first radial distance 370 from its axis of rotation 372 with a pair of arcuate slots 374 and 376 which are diametrally opposed. Said disc is furthermore provided at a second radial distance 378 from its axis of rotation 372 with a second pair of diametrally opposed slots 380 and 382.

Slots 374 and 376 have a polar coordinate extent of 92°. Slots 380 and 382 have an extent of 56°. The relationship of these slots to the cycle shaft 66 will be discussed below.

The timing disc and the slots associated therewith are intended to control a photoelectric system comprising light sources 384 and 386 disposed at radial distances from the axis of rotation of the disc 368 corresponding to the pairs of slots. Operatively associated with light sources 384 and 386 are light sensitive elements 388 and 390 diagrammatically indicated as being supported in bracket 392. Light sources 384 and 386 and light sensitive elements 388 and 390 cooperatively constitute photoelectric units which straddle the disc 368 and inspect the disc for the slots therein. In one condition, i.e., where the photoelectric units are inspecting a light impermeable portion of the disc, said units generate a signal in one state and when the units are inspecting a slotted portion of the disc they generate a signal of another state.

Disc 368 is coupled by a conventional mechanical means to the cycle shaft 66 and rotates at the same angular velocity as the shaft 66.

Starting from the at rest position of shaft 66, which will be considered 0° rotation, slots 374 and 376 are so arranged as to provide pulses beginning at 107° of rotation of said cycle shaft and terminating at 43° of the next sequential half rotation. This arrangement will be most evident from an inspection of FIG. 27 discussed hereinafter. Slots 380 and 382 will generate pulses extending from 167° of one-half of a cycle of rotation of shaft 66 and terminating at 43° of the next half cycle of rotation of shaft 66. Thus the photoelectric units will see the presence of slots 374 and 376 substantially in advance of seeing the presence of slots 380 and 382 when an inspection of disc 368 is being made.

Disc 368 is mechanically supported by a bracket 394 mounted on the frame of the typewriter, a support 396 being provided on which the aforesaid bracket 392 is mounted to support the photosensitive elements 388 and 390. Similarly, a bracket 398 is provided for light sources 384 and 386, there being further provided a hub 400 fixed to disc 368 and cooperating with a shaft 402 for rotation of said disc.

Figure 20:
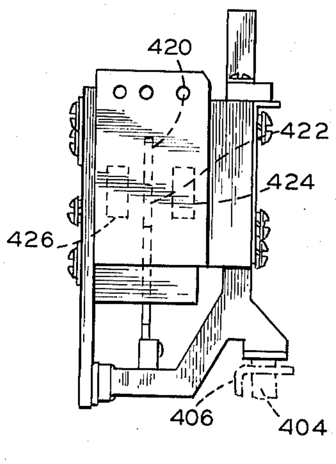
FIGURE 20 is a side view of the transmitter encoding means employed in accordance with the preferred embodiment of the invention.
Figure 21:
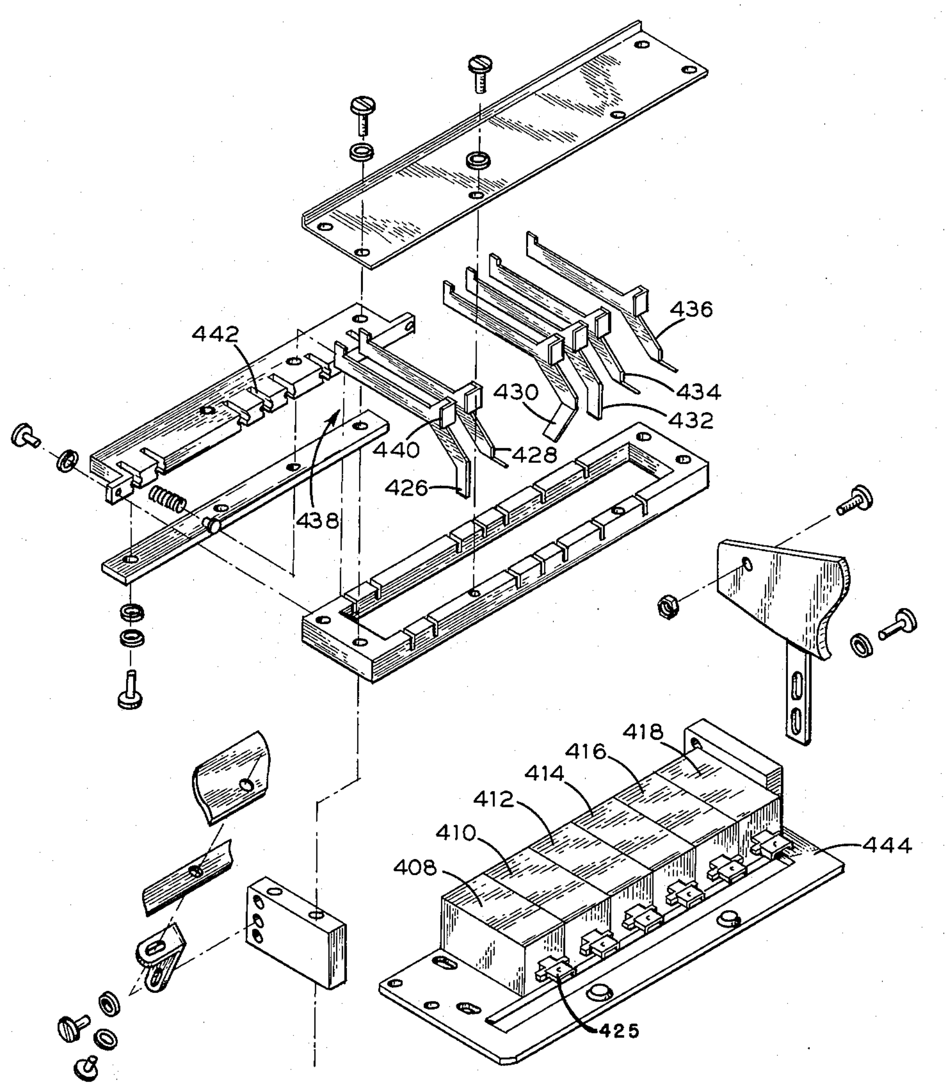
FIGURE 21 is an exploded perspective view of the assembly illustrated in FIG. 20.

Whereas FIGS. 17–19 are directed to the timing aspect of the invention, FIGS. 20 and 21 are directed to transmitter and coding means adapted to be sensitive to movements of the aforesaid latch interposers to provide information signals indicating the selection of a character during a typing operation.

In FIG. 20 appears the extremity 404 of a latch interposer, said extremity being received in a comb or guide 406 which permits a longitudinal displacement of the latch interposer while restricting lateral movement of the same.

As appears in FIGS. 20 and 21, there is comprised in this section of the apparatus a plurality of photoelectric switches 408, 410, 412, 414, 416 and 418, one of which has been diagrammatically noted as switch 318 with respect to FIG. 12.

Each said switch comprises a displaceable shutter 420 having therein an opening 422 selectively brought between a light source 424 and a light sensitive element 426 such that one is selectively screened and/or exposed to the other for the generation of an electrical signal.

Said shutters are provided with associated outer extensions, of which extension 425 is exemplary, these extensions being physically aligned with extremities 426, 428, 430, 432, 434, and 436 of slides 438, on each of which is fixed a flange 440.

Slides 438 are received in slots 442 which permit longitudinal movement of the slides and form guideways for the same.

Said photoelectric switches may be mounted on the frame 444 of said typewriter.

From what has been described above, it will appear that depending on whether the supported latch interposers are moved or not slides 438 will be moved through the engagement of said flanges 440 by the latch interposers whereupon said extensions 424 will be displaced or not to control the corresponding generation of various signals which cooperatively will constitute information signals indicating the identity of the characters selected.

Figures 22, 23:
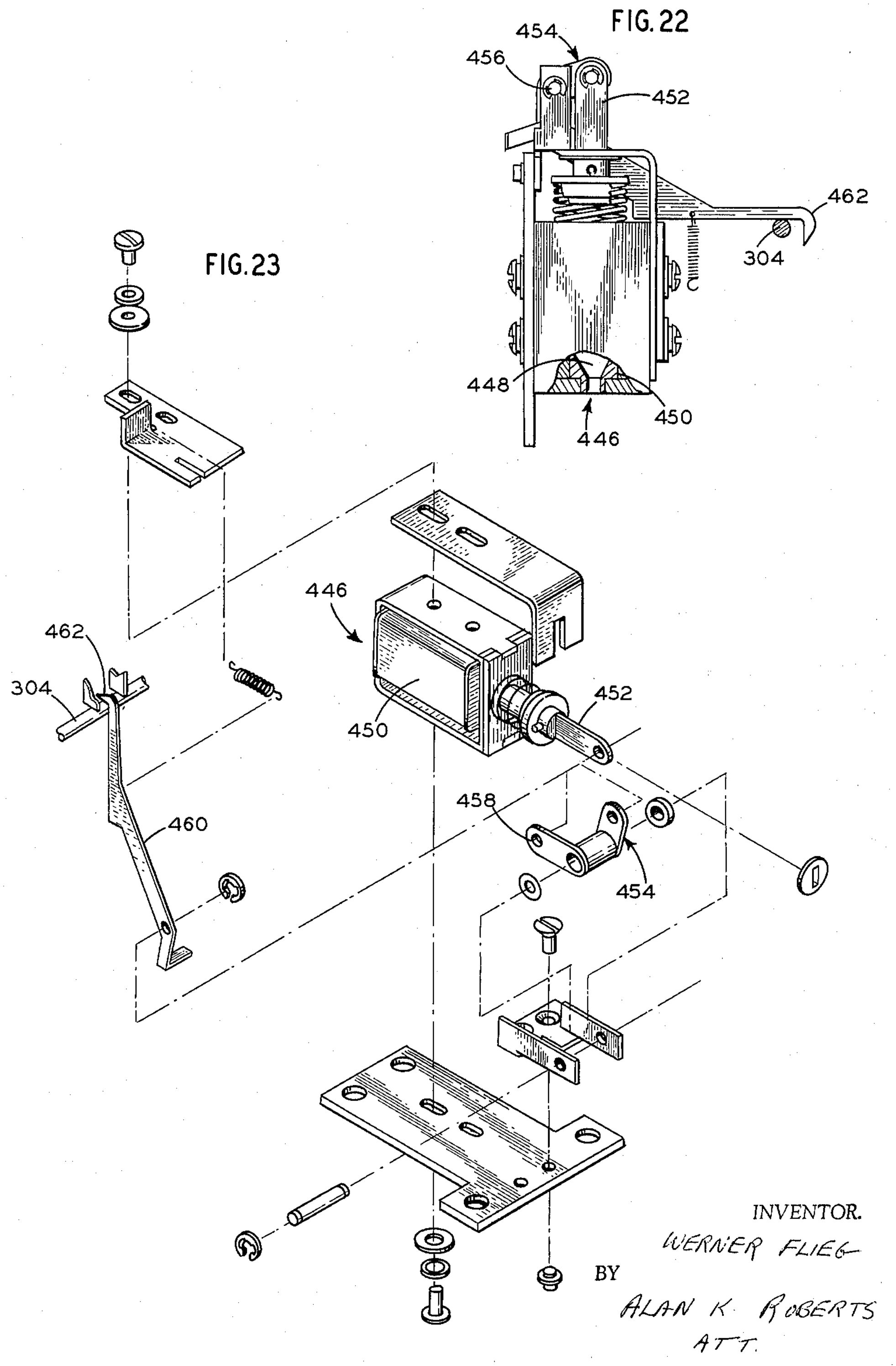
FIGURE 22 is a side view, partially in section, of a clutch trigger assembly employed in the preferred embodiment of the invention.
FIGURE 23 is an exploded, perspective view of the apparatus of FIG. 22.

FIGS. 22 and 23 show with great particularity the details of the clutch trigger means provided in accordance with the invention to enable the control of the above described clutch by means of an externally supplied signal.

Said means comprises a solenoid 446 having an armature 448 controlled by a winding 450 and provided with an external arm 452 which is effective to engage and pivot the pivoted trigger lever 454 supported on pin 456. Said pivoted lever includes an arm 458 pivotally engaged with a fishtail lever 460.

Fishtail lever 460 is an elongated link provided with a hooked extremity 462 which engages the cycle bail 304 (see also FIG. 12). In its position of rest the hooked extremity 462 is provided with a small clearance relative to said cycle bail.

It will be clear from the structure described above that the winding 450 can, through appropriate electrical connections, be made responsive to an externally supplied control signal to act with the armature 448 and cause the same to displace arm 452 and pivot trigger lever 454, whereby fishtail lever 456 is moved through the intermediary of arm 458 to displace cycle bail 304.

This action will commence the series of operations heretofore indicate for the purposes of disengaging the clutch engaging mechanisms from the clutch to permit the clutch to engage the motor and cycle shaft. It is, however, important to note from the description which follows that the solenoid 446 has a determinable actuation time so that the clutch engaging mechanism will not respond to an incoming signal until after a determinable delay.

Figures 24, 25:
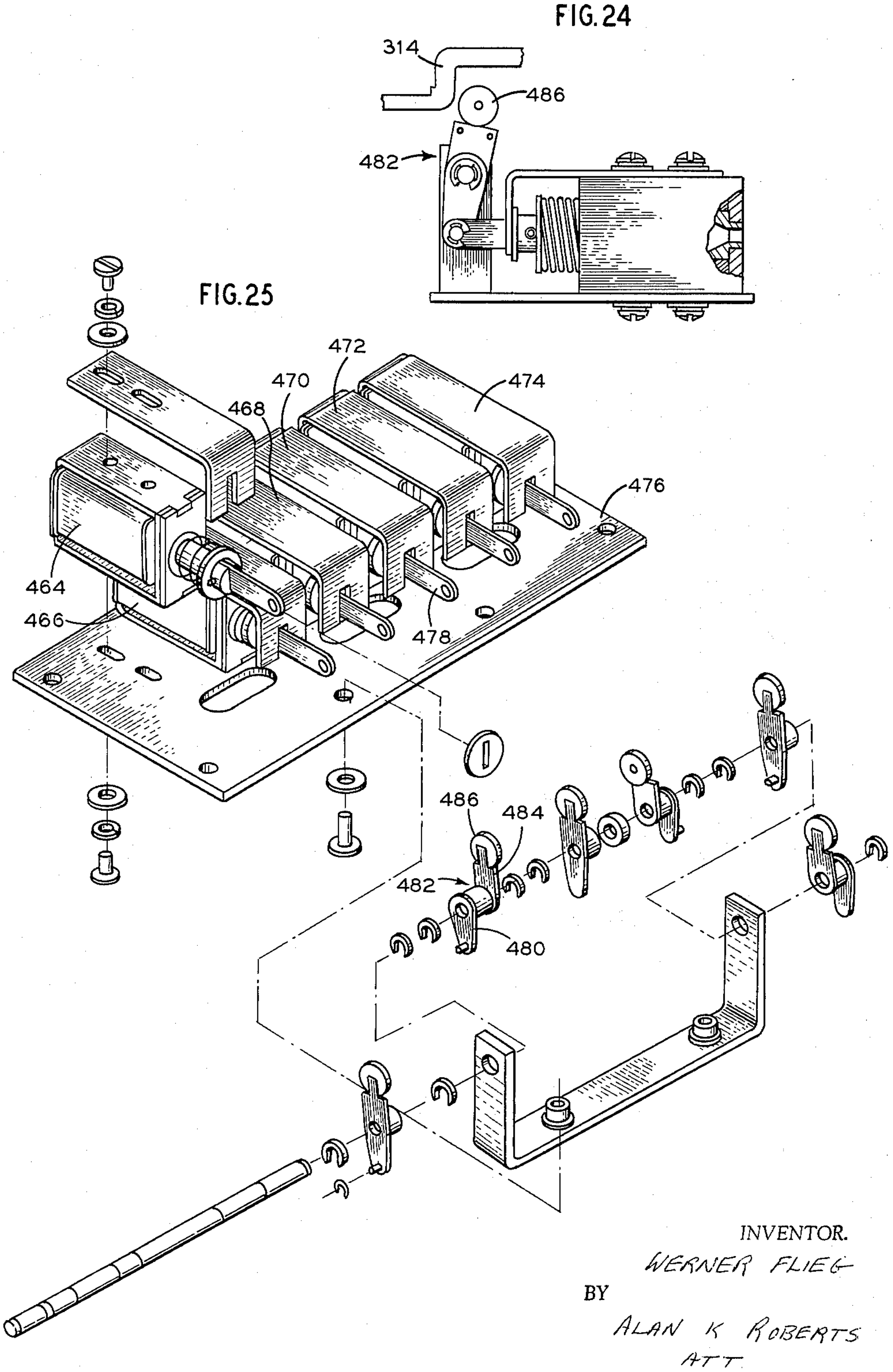
FIGURE 24 is a side view of a receiver operating means employed in accordance with a preferred embodiment of the invention.
FIGURE 25 is an exploded, perspective view of the apparatus of FIG. 24.

FIG. 24 and 25 show the operator receiving means of the invention, there being illustratively indicated solenoids 464, 466, 468, 470, 472 and 474, all of these solenoids being mounted on a plate 476 in turn mounted on the frame of the typewriter.

Each of the said solenoids includes an arm 478 attached to the armature thereof and in turn coupled to an arm 480 of a pivoted lever structure 482 having a second arm 484 on which is mounted a roller 486.

Said rollers 486 as best appears in FIG. 24 are in engagement with the associated latch interposers 314 to enable a selective displacement of the latter in accordance with which the associated selector latches are displaced for purposes of controlling the adjustment of the spherical print head.

It will also follow from the description above of the components of the receiver operator means that a plurality of signals constituting an information signal may be received by the apparatus of the invention and dispatched to said solenoids to cause a selective operation of the latch interposers which will then operate as has been described above.

Figure 26:
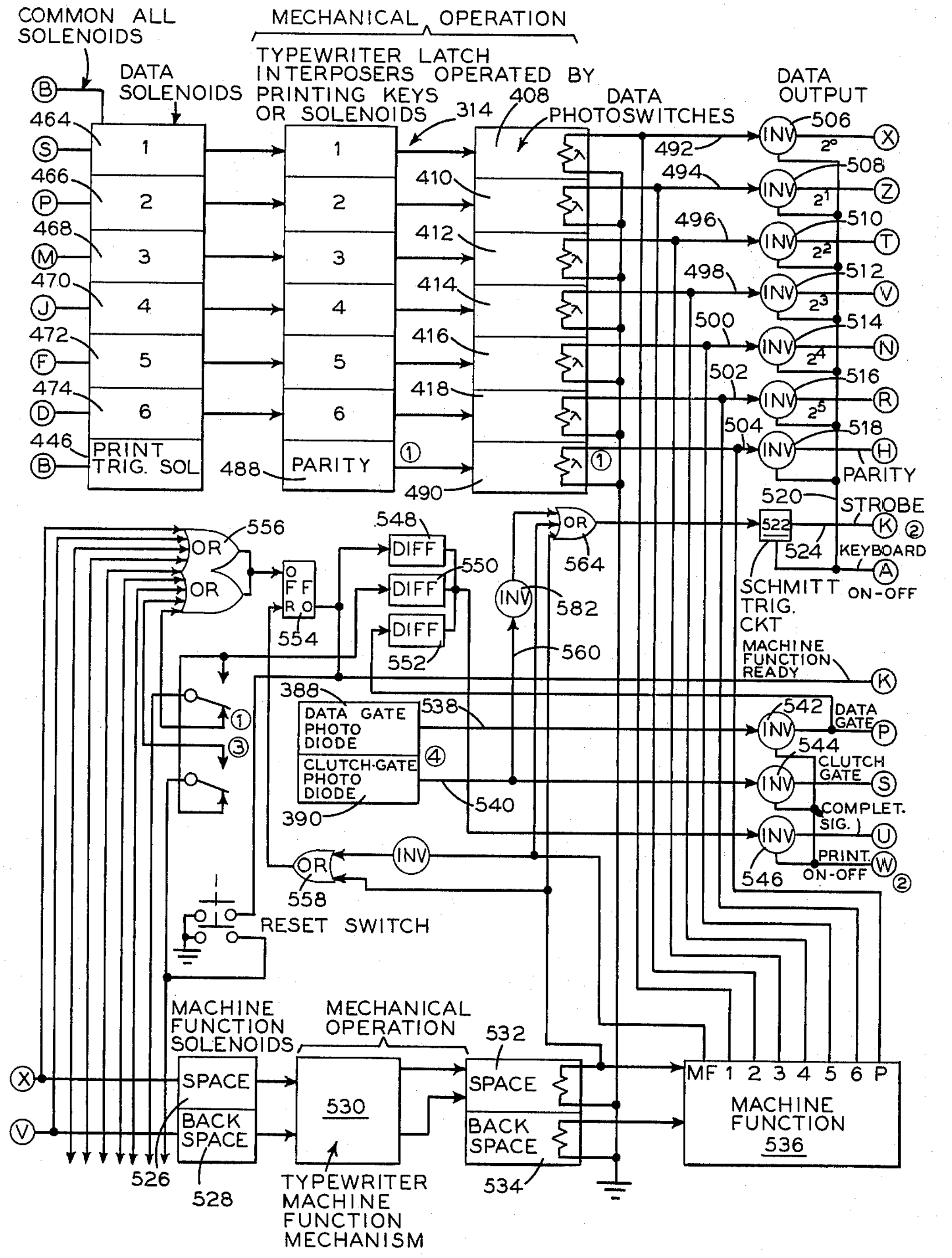
FIGURE 26 is a diagram of the various structures and electrical circuitry by means of which the various functions of the invention are achieved in association with the mechanical apparatus listed above.

FIG. 26 diagrammatically illustrates the relationship of various of the components mentioned above as well as the electrical circuitry associated with the same.

In FIG. 26 are illustrated the data solenoids 464, 466, 468, 470, 472 and 474 (see also FIGS. 24 and 25) and the print trigger solenoid 446 (see also FIGS. 22 and 23).

Said solenoids operate as has been heretofore indicated to displace latch interposers 314, there being a parity position 488 for checking the accuracy of the operation as is well known to those skilled in the art.

Latch interposers, in turn, operate photoelectric switches 408, 410, 412, 414, 416 and 418, there being an extra switch 490 provided to cooperate with parity position 488.

The outputs of the photoelectric switches 408–418 are transmitted via lines 492, 494, 496, 498, 500, 502 and 504 to inverters 506, 508, 510, 512, 514, 516 and 518 respectively. Said inverters are gated by a signal received via line 520, the signal control line 20 being provided by a Schmidt trigger circuit 522 and constituting a strobe signal also provided on line 524. This strobe signal, which will hereinafter be referred to in greater detail, is intended to assure that data is available in true form on the output lines supplied by the aforesaid inverters.

In addition to the aforesaid solenoids, a plurality of additional solenoids not heretofore described are employed such as, for example, the space solenoid 526 and the back-space solenoid 528. Additional solenoids may be provided for additional machine functions such as, for example, carriage return, index tab, tab set, tab clear, upper case shift, lower case shift and so forth. Said solenoids operate through mechanisms not herein disclosed to cause corresponding machine functions to be performed, said mechanisms being indicated generally at 530.

As with the operation of character keys described above, photoelectric switches, for example, switches 532 and 534, are associated with corresponding machine function mechanisms to generate output signals which are encoded in a machine function diode in coding matrix 536, the outputs of which are fed to inverters 506–518 to constitute useful information signals for transmission to cooperating apparatus.

Also illustrated in FIG. 26, in diagrammatic form, are data gate photo diode 388 and clutch gate photo diode 390 respectively coupled via lines 538 and 540 to inverters 542 and 544. A further inverter 546 is also employed.

There are three differentiating circuits 548, 550 and 552, the latter of which is coupled to inverter 542, differentiating circuit 548 being coupled to a flip-flop 554 coupled via or-gate 556 to the incoming signals provided for the machine function solenoids (e.g., solenoids 526 and 528) for purposes of the flip-flop being set and via or-gate 558 to the encoding matrix 536 and to the space photoelectric switch 532 for purposes of being reset.

The output of clutch gate photoelectric diode 390 is transmitted via line 560 to inverter 562 and thus via or gate 564 to Schmidt trigger circuit 522. Or gate 564 also receives signals from the encoding matrix 536 and from the photoelectric switch 532.

Figure 27:
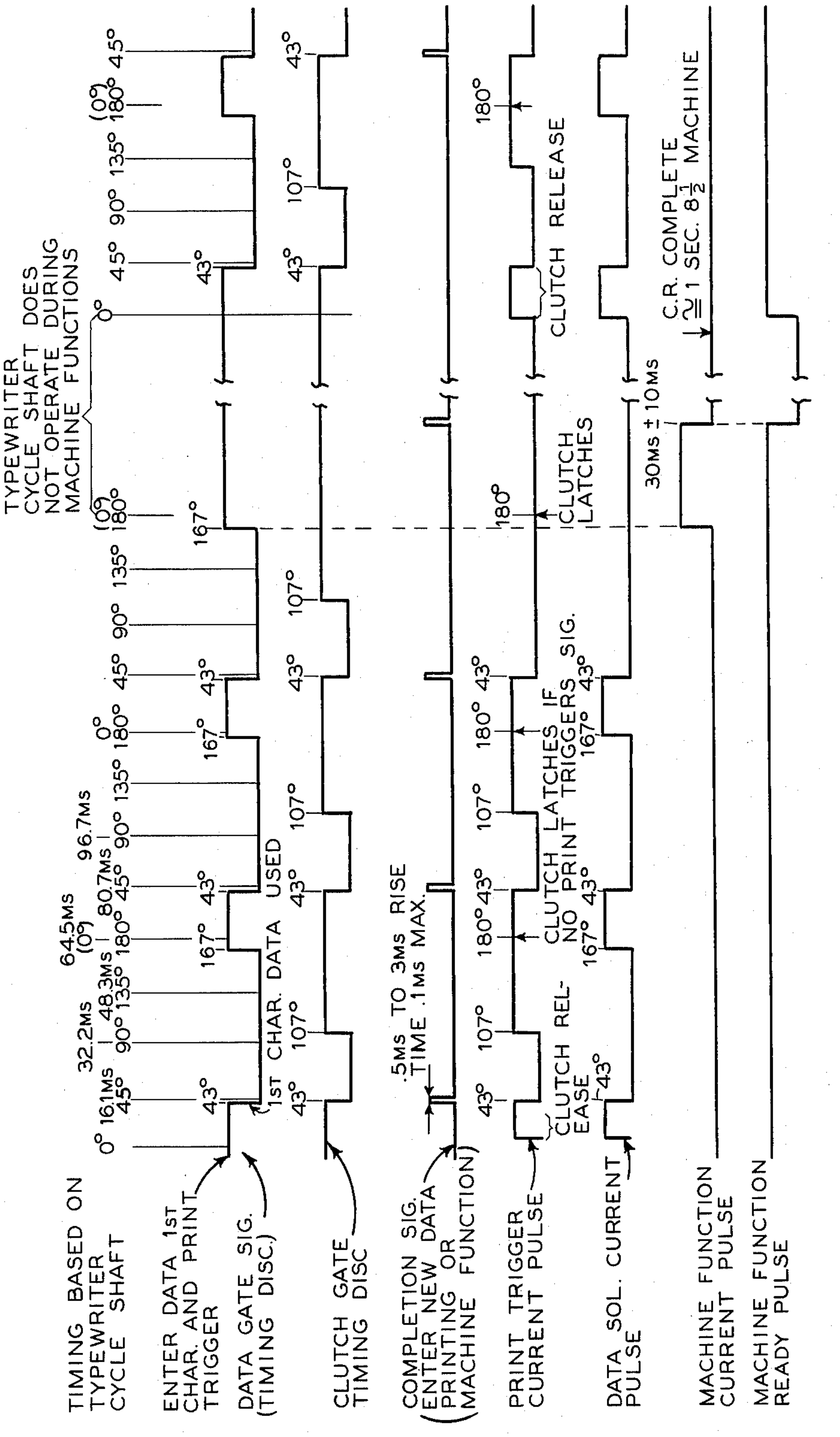
FIGURE 27 is a timing diagram of certain essential signals in the aforesaid apparatus and circuits for a data receiving operation.

FIG. 27 is a time diagram chart showing signals relating to the receiving of information and the operation of the aforesaid latch interposers by the associated latch interposer solenoids. The timing is based on the rotation of the cycle shaft 66 which as aforesaid rotates in increments of one-half of full rotations unless otherwise controlled. The clutch gate signals exist from 0–43° of each one-half rotation and disappear until 107° of the same and continue thence to 43° of rotation of the next successive half cycle. The data gate signals also exist to 43° of each half cycle of rotation and disappear until 167° of the same half cycle and thence continue to the end of the half cycle and 43° into the next successive cycle.

The printing of a character requires two operations, selection of the code solenoids (e.g., 464–474 of FIGS. 24 and 25) and energizing of the print trigger solenoid (e.g., solenoid 446, FIGS. 22 and 23), which releases the aforedescribed clutch to allow the cycle shaft 66 to operate.

Data solenoids must not be energized unless the data gate is in the logical one state (i.e., the slot is being examined by the associated photoelectric unit), otherwise it is possible to break the positioning bands noted above which operate to position the spherical print head.

The data gate signal is as known from the aforegoing description derived by photoelectrically sensing slots 380 and 382 in the timing disc 368 which defines the angular position of the cycle shaft 66 over which the data solenoids may be safely energized. The data gate is at logical One for the rest position of the shaft 66 and becomes logical Zero when the shaft reaches an angular position at which it is no longer permissible to pull the aforedescribed latches.

For operation at slow speed, the cycle shaft 66 always comes to rest before starting on a new character. The acceleration time required by the cycle shaft at slow speed provides ample time for the solenoids to pull the selected latches. However, when operating at a high speed where it is not desirable for shaft 66 to come to rest or lose speed, the data gate goes to logical One during the preceding cycle at a position of approximately 167°. This provides the time required for the solenoids to cause latch selection before the end of the data gate. For high speed operation data solenoids must be energized for the full duration of the data gate signal to insure latch selection.

The print trigger solenoids when energized engages the clutch of cycle shaft 66. The major purpose of the clutch gate signal generated by slots 374 and 376 is to provide a release command for the print trigger solenoid to allow said clutch to disengage early enough in a cycle to avoid repeating characters. When starting the cycle shaft from rest the print trigger solenoid can be released as soon as the solenoid has tripped the clutch release mechanism if only one cycle is desired. When operating at high speed to stop following a selected cycle, the print trigger solenoid must be disengaged when the clutch gate signal goes to logical Zero to allow the solenoid to become inactive. To maintain a high speed operation the print trigger solenoid must be energized soon enough in the preceding cycle to allow the clutch to engage so that there is no loss of shaft speed.

The completion signal indicated in FIG. 27 is generated in two ways. When operating the shaft 66, the trailing edge of the data gate signal generates a completion pulse which indicates that the input data has been used and the typewriter is ready for the next character. The completion signal may also be generated by a machine function photoelectric switch.

Figure 28:
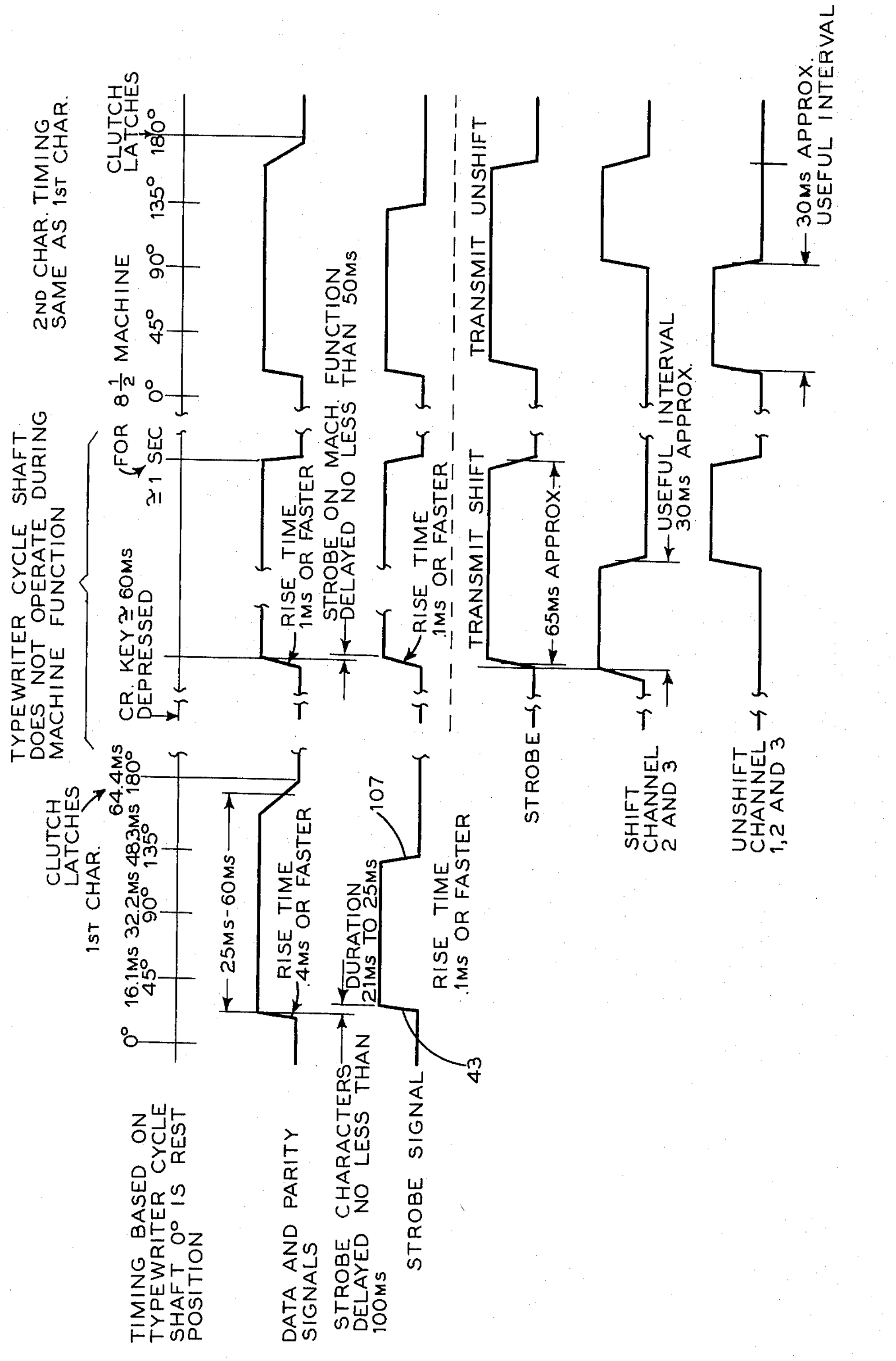
FIGURE 28 is a timing diagram of certain essential signals related to a data or information transmitting function performed in accordance with the invention.

In FIG. 28 is also indicated a timing cycle dependent on rotation of the cycle shaft 66. The data signals and parity signals are thus generated by the photoelectric switches of FIGS. 21 and 22. The strobe signal is then generated by Schmidt trigger circuit 525 in FIG. 26.

As follows from the description hereinabove, a depression of a character key activates a selector interposer which in turn causes the operation of a photoelectric switch and causes a rotation of cycle shaft 66. The strobe signal is generated from the logical Zero state of the clutch gate signal which occurs during rotation of cycle shaft 66. The leading edge of the strobe signal occurs preferably about 3 to 4 milliseconds after the photoelectric switches are operated, thus insuring that transmittable data is present at the output when the leading edge of the strobe signal occurs.

From the above it will be appreciated that the invention contemplates the provision of apparatus comprising printing means to effect a printing operation along with a motor and coupling cams adapted for coupling said motor to the printing means to supply a driving force for the latter, said coupling means normally being ineffective to couple the motor and printing means, said apparatus, moreover, comprising control means coupled to the coupling means to cause the same to couple the motor and printing means. This control means has a determinable actuation time and is normally operative upon actuation to couple the motor and printing means throughout a determinable angle of rotation of the motor whereafter the printing means and the motor are automatically decoupled. Said apparatus, moreover, is provided with a timing disc having a system of slots inspected by photoelectric means providing a signal so that the control means can be reoperated sufficiently in advacne of the decoupling of the printing means and motor as to enable a contiinuous printing operation.

It will be further noted that the invention contemplates apparatus wherein photoelectric means are responsive to mechanical elements controlling the positioning of a spherical printing head for generating information signals for external use.

Further, it is to be noted that the invention contemplates the use of solenoids responsive to external signals to actuate latch interposers for the positioning of a spherical print head and for controlling the actuation of a printing mechanism to effect a printing operation.

There will now be obvious to those skilled in the art many modifications and variations of the structures and techniques advanced above. These modifications and variations will not depart from the scope of the invention if defined by the following claims.

What is claimed is:

1. For use with apparatus adapted for receiving and employing information signals representative of data being marked on a record medium and for transmitting information signals to control the marking of data on a record medium, a typewriter transmitter receiver comprising a print sphere including print characters thereon, control means supporting said sphere for adjustment whereby to bring a single one of said characters into effective printing position, a rotatable cycle shaft, a plurality of mechanical elements operatively coupled to said control means and displaceable by operation of said shaft to actuate said control means, a motor, a clutch for coupling said cycle shaft to said motor, a clutch linkage system normally adapted to engage said clutch to disengage the cycle shaft from said motor, said clutch linkage system being effective to disengage the cycle shaft automatically from the motor after the shaft and motor have been coupled, mechanical means to engage the clutch linkage system and operate through the same and said clutch to engage the cycle shaft with said motor; receiver operating means associated with said mechanical elements and responsive to externally supplied information signals for selecting a character on said sphere, said operating means comprising a solenoid operatively associated with each of said mechanical elements to operate the same, pivoted levers coupled to and operated by the solenoids, and rollers on the levers to engage and displace the mechanical elements and select a character; clutch trigger means operative to control said clutch to couple said cycle shaft to said motor and print a character selected by said receiver operating means, said trigger means comprising a trigger solenoid, a pivoted trigger lever operated by said trigger solenoid, and a pivoted fishtail lever operated by the trigger lever and in hooked engagement with the mechanical means to actuate the same; timing means comprising a timing disc coupled to and rotated by said cycle shaft about an axis of rotation in 1:1 relationship with said cycle shaft, said disc being provided at a first radial distance from its axis of rotation with two diametrally opposed first arcuate slots of the same length and at a second radial distance with two further and shorter diametrally opposed second arcuate slots, photoelectric units straddling said disc and in a position to scan said slots and being thereby adapted to generate signals adapted for indicating first and second states, said slots being of such length and orientation that one of said units generates a data gate signal being in first state from about 0–43° and 167°–180° of each half rotation of said cycle shaft and in second state between about 43°–167° of said half rotation and that the other of said units generates a clutch gate signal being in first state from about 0–43° and 107°–180° of each half rotation of said cycle shaft and in second state between about 43°–107° of said half rotation; means responsive to an externally supplied signal indicating the availability of new information signals for the solenoids of said receiver operating means and to said clutch gate signal in first state to actuate the solenoid of said trigger means whereby the clutch is effective to engage said cycle shaft and motor, and means responsive to the data gate signal in the first state to transmit the new information signals to solenoids of the receiver operating means to actuate the same to select a character.

2. For use with apparatus adapted for receiving and employing information signals representative of data being marked on a record medium and for transmitting information signals to control the marking of data on a record medium, a typewriter transmitter receiver comprising a print sphere including print characters thereon, control means supporting said sphere for adjustment whereby to bring a single one of said characters into effective printing position, a rotatable cycle shaft, a plurality of mechanical elements operatively coupled to said control means and displaceable by operation of said shaft to actuate said control means, a motor, a clutch for coupling said cycle shaft to said motor, a clutch linkage system normally adapted to engage said clutch to disengage the cycle shaft from said motor, said clutch linkage system being effective to disengage the cycle shaft automatically from the motor after the shaft and motor have been coupled, mechanical means to engage the clutch linkage system and operate through the same and said clutch to engage the cycle shaft with said motor; transmitter encoding means responsive to displacement of said mechanical elements for generating information signals, said encoding means including photoelectric switches associated with respective of said mechanical elements and comprising associated light sources and light sensitive elements and displaceable shutters for selectively screening the light sensitive elements from the light sources to generate an information signal, slides including flanges adapted for being engaged by said mechanical elements, and a mount supporting said slides and photoelectric switches such that the mechanical elements can operate through the flanges and slides to control said shutters to generate information signals; receiver operating means associated with said mechanical elements and responsive to externally supplied information signals for selecting a character on said sphere, said operating means comprising a solenoid operatively associated with each of said mechanical elements to operate the same, pivoted levers coupled to and operated by the solenoids, and rollers on the levers to engage and displace the mechanical elements and select a character; clutch trigger means operative to control said clutch to couple said cycle shaft to said motor and print a character selected by said receiver operating means, said trigger means comprising a trigger solenoid, a pivoted trigger lever operated by said trigger solenoid, and a pivoted fishtail lever operated by the trigger lever and in engagement with the mechanical means to actuate the same; timing means comprising a timing disc coupled to and rotated by said cycle shaft about an axis of rotation in 1:1 relationship with said cycle shaft, said disc being provided at a first radial distance from its axis of rotation with two diametrally opposed first arcuate slots of the same length and at a second radial distance with two further and shorter diametrally opposed second arcuate slots, photoelectric units straddling said disc and in a position to scan said slots and being thereby adapted to generate signals adapted for indicating first and second states, said slots being of such length and orientation that one of said units generates a data gate signal being in first state from about 0–43° and 167°–180° of each half rotation of said cycle shaft and in second state between about 43°–167° of said half rotation and that the other of said units generates a clutch gate signal being in first state from about 0–43° and 107°–180° of each half rotation of said cycle shaft and in second state between about 43°–107° of said half rotation; means responsive to an externally supplied signal indicating the availability of new information signals for the solenoids of said receiver operating means and to said clutch gate signal in first state to actuate the solenoid of said trigger means whereby the clutch is effective to engage said cycle shaft and motor, means responsive to the data gate signal in the first state to transmit the new information signals to solenoids of the receiver operating means to actuate the same to select a character, and means responsive to the clutch gate signal in the second state to transmit signals from the photoelectric switches in the encoding means to said apparatus.

3. For use with apparatus adapted for receiving and employing information signals representative of data being marked on a record medium and for transmitting information signals to control the marking of data on a record medium, a typewriter transmitter receiver comprising a frame, a platen on said frame and adapted to constitute a support for a record medium, a print sphere having an axis of symmetry and including four parallel and concentric bands of surface print characters spaced axially along said axis, the characters of each band being circumferentially spaced around said sphere, a rocker adapted for supporting said sphere for movement towards said platen, means operatively associated with said rocker to guide the same along said platen, tilt and rotate control means supporting said sphere on said rocker for tilting adjustment in a plane passing through and including said axis and for rotational adjustment on said axis whereby to bring a single one of said characters into effective position relative to said platen, each said control means including a control pulley by which said adjustment is effected, two pairs of spaced pulleys straddling the control pulleys, bands engaged with the pulleys and responsive to relative movement between the spaced pulleys for operating the control pulleys, pivoted supports supporting one of each of said pairs of pulleys, bell cranks coupled to and adapted to pivot said supports, systems of linkages coupled to said bell cranks to operate the same and respectively including latches the selective engagement and displacement of which pivots said supports, a latch bail adapted to engage and displace said latches depending upon the position of the latter, a rotatable cycle shaft, a cam on said shaft to displace said bail, a plurality of parallel latch interposers coupled to said latches and being displaceable to control the positioning of said latches for engagement by said bail, selector bails engaging said interposers to displace the same, selector interposers for engaging and displacing said selector bails, key levers manually operable to select characters and adapted to displace the selector interposers to a position of readiness wherefrom the selector bails can be engaged, a filter shaft coupled to and driven by the cycle shaft and adapted for displacing the selector interposers from said position of readiness to displace selector bails, a motor, a clutch for coupling said cycle shaft to said motor, a clutch linkage system normally adapted to engage said clutch and disengage the cycle shaft from said motor, said clutch linkage system being effective to disengage the cycle shaft automatically from the motor after one-half of a complete rotation when the cycle shaft and motor have been engaged, a cycle bail engageable by said selector interposers to engage the clutch linkage system and operate through the same and said clutch to engage the cycle shaft with said motor, a print shaft coupled to and driven by said cycle shaft, print means operatively coupling said rocker to said print shaft to effect a printing operation; transmitter encoding means responsive to displacement of said latch interposers for generating information signals; receiver operating means associated with said latch interposers and responsive to externally supplied information signals for selecting a character on said sphere; clutch trigger means operative to control said clutch to couple said cycle shaft to said motor and print a character selected by said receiver operating means; timing means comprising a timing disc coupled to and rotated by said cycle shaft about an axis of rotation in 1:1 relationship with said cycle shaft, said disc being provided at a first radial distance from its axis of rotation with two diametrally opposed first arcuate slots of the same length and at a second radial distance with two further and shorter diametrally opposed second arcuate slots, photoelectric units straddling said disc and in a position to scan said slots and being thereby adapted to generate signals adapted for indicating first and second states, said slots being of such length and orientation that one of said units generates a data gate signal being in first state from about 0–43° and 167–180° of each half rotation of said cycle shaft and in second state between about 43–167° of said half rotation and that the other of said units generates a clutch gate signal being in first state from about 0–43° and 107–180° of each half rotation of said cycle shaft and in second state between about 43–107° of said half rotation; means responsive to an externally supplied signal indicating the availability of new information signals for said receiver operating means and to said clutch gate signal in first state to actuate said trigger means whereby the clutch is effective to engage said cycle shaft and motor, means responsive to the data gate signal in the first state to transmit the new information signals to the receiver operating means to actuate the same to select a character, and means responsive to the clutch gate signal in the second state to transmit signals from the encoding means to said apparatus.

References Cited by the Examiner

UNITED STATES PATENTS

| | | | |
|---|---|---|---|
| 2,408,754 | 10/1946 | Bush | 178—79 |
| 2,757,605 | 8/1956 | Dumey | 101—93 |
| 2,813,480 | 11/1957 | Fowler | 197—20 X |
| 2,879,876 | 3/1959 | Palmer et al. | 197—52 X |
| 2,906,200 | 9/1959 | Pfleger | 101—93 |

(Other references on following page)

UNITED STATES PATENTS

| | | | |
|---|---|---|---|
| 2,919,002 | 12/1959 | Palmer | 197—16 |
| 3,014,569 | 12/1961 | Palmer | 197—16 |
| 3,017,463 | 1/1962 | Dinsmore et al. | 178—79 |
| 3,045,795 | 7/1962 | Morrison et al. | 197—20 |
| 3,063,537 | 11/1962 | Allen | 197—19 |
| 3,077,971 | 2/1963 | Palmer | 197—16 |
| 3,082,854 | 3/1963 | Becker et al. | 197—19 |
| 3,086,635 | 4/1963 | Palmer | 197—16 |
| 3,088,401 | 5/1963 | Shimabukuro | 101—93 |
| 3,135,371 | 6/1964 | Young | 197—16 |
| 3,157,265 | 11/1964 | Palmer | 197—16 |

OTHER REFERENCES

IBM Technical Disclosure Bulletin, vol. 5, No. 2, July 1962, pages 48 and 49 relied on.

DAVID KLEIN, *Primary Examiner.*

ROBERT E. PULFREY, *Examiner.*

EDGAR S. BURR, *Assistant Examiner.*